(12) United States Patent
Temple

(10) Patent No.: US 7,937,964 B2
(45) Date of Patent: May 10, 2011

(54) DURABLE, HIGH QUALITY, PORTABLE SOUND SYSTEM MOUNTING KIT

(76) Inventor: Anthony Joey Temple, Lake Havasu City, AZ (US)

( * ) Notice: Subject to any disclaimer, the term of this patent is extended or adjusted under 35 U.S.C. 154(b) by 896 days.

(21) Appl. No.: 11/728,303

(22) Filed: Mar. 26, 2007

(65) Prior Publication Data

US 2007/0279891 A1   Dec. 6, 2007

Related U.S. Application Data

(60) Provisional application No. 60/789,714, filed on Apr. 7, 2006.

(51) Int. Cl.
*F25D 3/08* (2006.01)

(52) U.S. Cl. ........ 62/457.1; 62/440; 62/457.5; 381/300; 455/350; 455/351; 84/600

(58) Field of Classification Search .................. None
See application file for complete search history.

(56) References Cited

U.S. PATENT DOCUMENTS

| | | | | |
|---|---|---|---|---|
| 4,571,740 A * | 2/1986 | Kirby et al. | ............ | 455/344 |
| 4,700,395 A * | 10/1987 | Long | ............ | 381/334 |
| 4,817,191 A * | 3/1989 | Adams | ............ | 455/351 |
| 5,235,822 A * | 8/1993 | Leonovich, Jr. | ............ | 62/457.2 |
| 5,305,544 A * | 4/1994 | Testa, Jr. | ............ | 43/54.1 |
| 5,447,041 A * | 9/1995 | Piechota | ............ | 62/457.7 |
| 5,781,853 A * | 7/1998 | Johnson | ............ | 455/351 |
| 5,979,175 A * | 11/1999 | Ellison | ............ | 62/457.7 |
| 6,216,488 B1 * | 4/2001 | Rucker | ............ | 62/457.7 |
| 6,305,185 B1 * | 10/2001 | Sloan | ............ | 62/457.7 |
| 6,814,383 B2 * | 11/2004 | Reed et al. | ............ | 296/24.3 |
| 6,980,788 B2 * | 12/2005 | Peeples | ............ | 455/347 |
| 7,188,491 B2 * | 3/2007 | Donald et al. | ............ | 62/457.7 |
| 2003/0139169 A1 * | 7/2003 | Arreazola, Jr. | ............ | 455/344 |
| 2003/0157893 A1 * | 8/2003 | Peeples | ............ | 455/66 |
| 2004/0026946 A1 * | 2/2004 | Reed et al. | ............ | 296/24.3 |
| 2004/0027001 A1 * | 2/2004 | Reed, III | ............ | 307/10.1 |
| 2004/0237574 A1 * | 12/2004 | Donald et al. | ............ | 62/457.7 |
| 2005/0233689 A1 * | 10/2005 | Uren | ............ | 454/184 |
| 2008/0025544 A1 * | 1/2008 | Maldonado | ............ | 381/334 |
| 2009/0158770 A1 * | 6/2009 | Cohrs et al. | ............ | 62/457.9 |

* cited by examiner

*Primary Examiner* — Marlon T Fletcher
(74) *Attorney, Agent, or Firm* — Weide & Miller, Ltd.

(57) ABSTRACT

A mounting kit consisting of a top panel made from polyethylene plastic with designated areas cut out to accommodate a standard car stereo and four speakers along with optional support sides also made from polyethylene plastic to allow for installation within an ice chest (cooler) or other secure, durable container. An antenna, screws, power switch, charging receptacle and all mounting hardware are included.

18 Claims, 3 Drawing Sheets

DURABLE, HIGH QUALITY, PORTABLE SOUND SYSTEM MOUNTING KIT

This application claims priority from Provisional Application 60/789,714, filed on Apr. 7, 2006.

BACKGROUND OF THE INVENTION

The present invention relates to a portable radio/stereo/compact disc player, that an individual is able to transport anywhere allowing that said individual to enjoy music at any time with ease. Portable stereos are a very desired, popular item of today's public but the "Durable, High Quality, Portable Sound System Mounting Kit" will enable anyone to create a finished product that will withstand use for a longer period of time than the average portable sound system in that it will be stronger and more able to withstand life's elements indoors and outdoors.

SUMMARY OF THE INVENTION

The invention disclosed herein will far surpass the present portable sound systems on the market today in that after the "Durable, High Quality, Portable Sound System Mounting Kit" is completely installed inside of a secure, durable container (i.e., cooler/ice chest) of an individual's choice along with the actual sound system components and a 12 volt/12amp battery (purchased separately by the individual) it will be fully self contained and protected from the elements of life. It will be capable of surviving extreme use and wear and tear by today's society in almost any adventure. Perfect for the camper, beach-goer, tailgater, boater, backyard partier, etc., the completed high quality, durable, portable sound system provides a more powerful sound system that is fully protected from water, dirt, dust, etc., and the secure, durable container will also provide protection for the components from contact and impact.

VARIATIONS OF THE INVENTION

Figure 1:
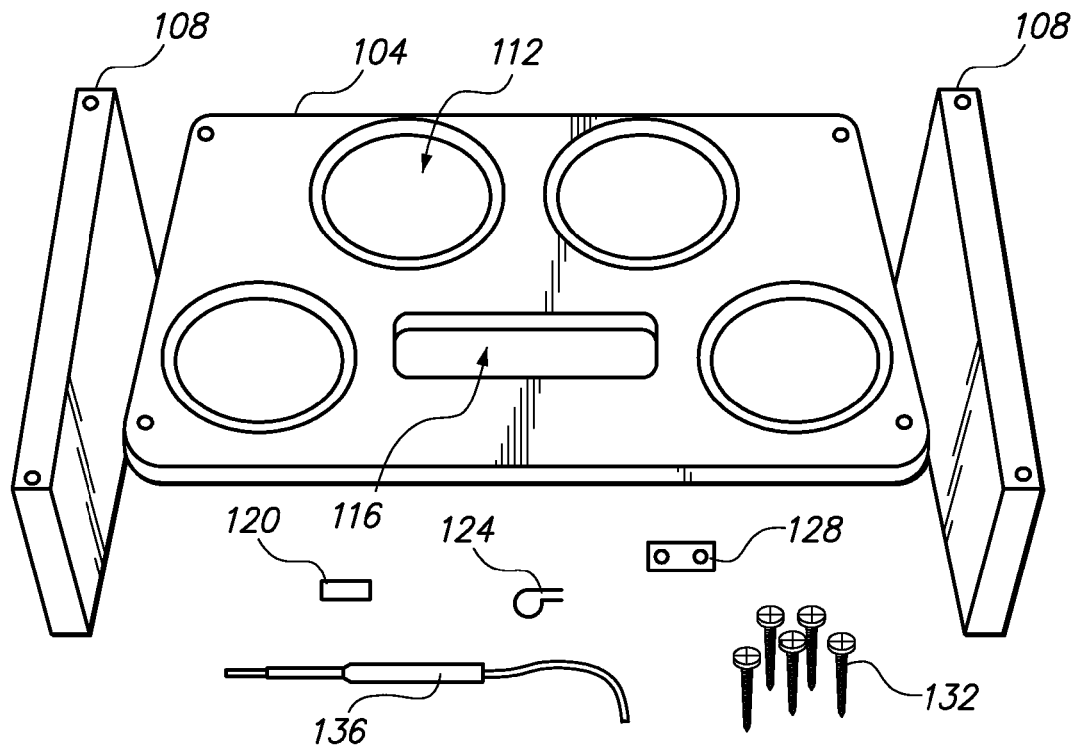
FIG. 1 shows the "Durable, High Quality, Portable Sound System Mounting Kit" containing a pre-cut top unit with optional support sides for installation within a secure, durable container (i.e., cooler/ice chest), antenna, power switch, charging receptacle, screws, and hardware needed for complete mounting.
Figure 2:
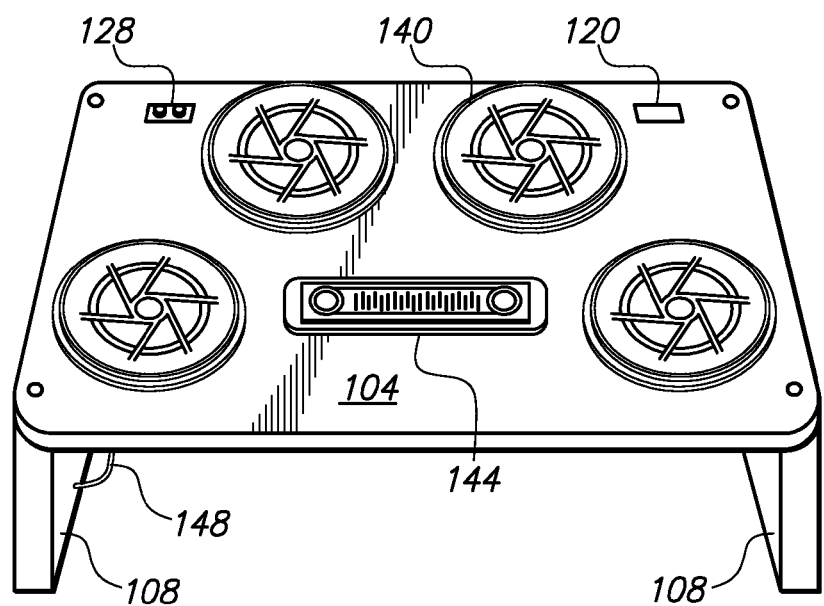
FIG. 2 shows a fully mounted sound system after installation within the "Durable, High Quality, Portable Sound System Mounting Kit".
Figure 3:
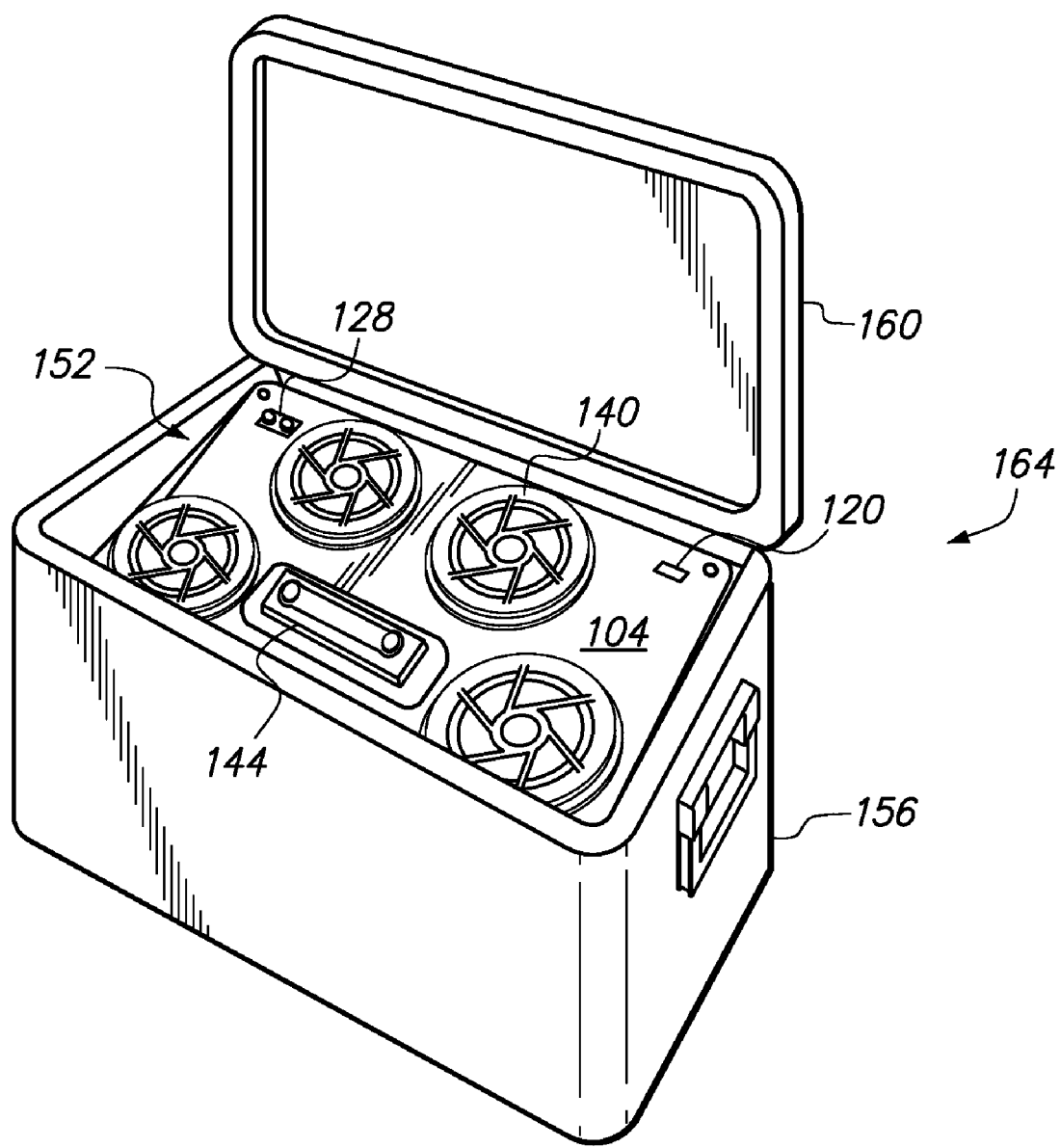
FIG. 3 shows the completed result. All components are securely mounted inside of a durable container (i.e., cooler/ice chest) to create quality sound with ease of portability. The durable container has become the protective housing for all components thus creating the ultimate portable sound system.
Figure 4:
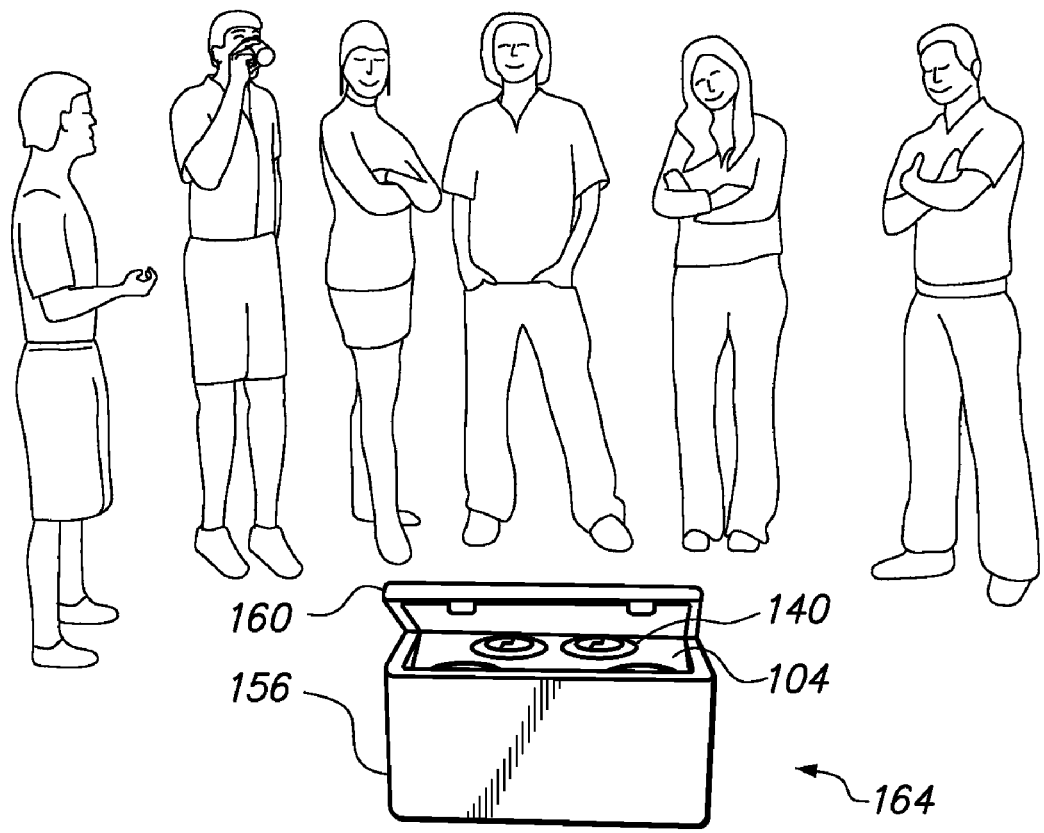
FIG. 4 shows one of many situations where the finished product can be put to good use and provide quality entertainment.

In one embodiment, a mounting kit for mounting one or more speakers and a car stereo within a cooler is provided. The mounting kit may comprise a cooler 164, a top panel or fixed support panel 104 and one or more side supports 108. The mounting kit will now be described with regard to FIGS. 1-4.

The cooler 164 may comprise a waterproof container 156 having an open top end 152, a front wall, a back wall, two side walls, and an enclosed bottom end. The cooler's waterproof container 156 is insulated to reduce temperature changes within the waterproof container. A movable lid 160 may be at a top end of the waterproof container 156. The movable lid 160 may have a peripheral shape corresponding to a peripheral shape of the open top end 152 and configured to seal the open top end.

It can be seen that the fixed support panel 104 is a remote and separate element from the movable lid 160 and located below the movable lid and within the waterproof container 156 of the cooler 164. The fixed support panel 104 may have one or more first cutouts 116 configured to accept at least one car stereo 144 and one or more second cutouts 112 configured to accept at least one speaker 140. The first cutouts 116 may have a distinct shape relative to the second cutouts 112. For example, the first cutouts 116 may be rectangular while the second cutouts 112 are circular. The fixed support panel 104 may also have a planar rectangular shape that extends between the walls of the waterproof container 156. The fixed support panel 104 can be made from a rigid material, such as masonite fiberboard and polyethylene plastic.

One or more side supports 108 may be used to attach the fixed support panel 104 to an interior portion of the waterproof container 156. For example, one or more side supports 108 may be in contact with a bottom surface of the fixed support panel 104 and a wall of the waterproof container 156 to attach the fixed support panel to the waterproof container. The fixed support panel 104 may be located and secured within the waterproof container 156 such that the movable lid 160 of the cooler moves between an open position and a closed position relative to the waterproof container and the fixed support panel without ever contacting the fixed support panel.

It is noted that the side supports 108 may extend from a bottom surface of the fixed support panel 104 to the enclosed bottom end of the waterproof container 156 of the cooler 164. In addition, the side supports 108 may be formed with a top edge that is angled downward from the back wall to the front wall of the cooler. In this manner, the fixed support panel 104 (which is secured by the side supports 108) slopes downward from the back wall to the front wall of the cooler 164. The side supports 108 may be attached to the waterproof container 156 of the cooler 164 by the one or more fasteners 132.

An electrical switch 128 may be mounted to the fixed support panel 104. An antenna 136 may be mounted within the waterproof container 156 and below the fixed support panel 104. A battery may also be within the waterproof container 156 and below the fixed support panel 104.

In another embodiment, a stereo mounting kit for mounting a stereo system within a cooler 164. The mounting kit may comprise a cooler 164 comprising an insulated waterproof container 156 for protecting the stereo system from moisture, a fixed support panel 104, and one or more side supports 108.

The insulated waterproof container 156 may comprise a planar bottom, a plurality of walls extending upward from the planar bottom to a top end of the insulated waterproof container, and a movable lid 160 at the top end of the insulated waterproof container 156. The movable lid 160 may have a planar shape configured to cover the top end of the insulated waterproof container 156. The movable lid 160 may be insulated as well.

A fixed support panel 104 is remote from the movable lid 160 and located below the movable lid, and within the insulated waterproof container 156. The fixed support panel 104 may have a planar body comprising a first rectangular opening 116 and one or more second openings 112. The first rectangular opening may be configured to correspond to the peripheral shape of a stereo head unit 144. The one or more second openings 112 may have a distinct shape relative to the first rectangular opening 112 and be configured to accept one or more speakers 140.

One or more side supports 108 may be used to attach the fixed support panel 104 to an interior portion of the insulated waterproof container 156 of the cooler 164 such that the insulated movable lid 160 of the cooler moves between an open position and a closed position relative to the waterproof container and the fixed support panel without ever contacting the fixed support panel.

An antenna 136 having an electrical connector portion for connection with the stereo head unit 144, and a power switch 128 mounted to the fixed support panel 104 and configured to connect to a power source and the stereo head unit 144 may be included in the mounting kit. It is contemplated that a battery may be the power source within the insulated waterproof container 156 and below the fixed support panel 104.

The mounting kit may be used in various ways. For example, in one embodiment, a method of mounting a stereo within a cooler 164 is provided. The method may begin by opening a movable lid 160 of the cooler 164 to gain access to a waterproof compartment 156 of the cooler through a top end of the cooler.

A fixed support panel 104 may then be mounted within the waterproof compartment 156 of the cooler 164 at a location below the movable lid 160 of the cooler. The fixed support panel 104 is remote from and a separate element from the movable lid 160. This mounting may occur by attaching the fixed support panel 104 to an interior portion one or more side walls of the cooler 164. Since the fixed support panel 104 is below the movable lid 160, the movable lid moves between an open position and a closed position relative to the waterproof compartment and the fixed support panel without ever contacting the fixed support panel.

A stereo head unit 144 may be secured to a first opening 116 in the fixed support panel 104, and one or more speakers 104 may be secured to one or more second openings 112 in the fixed support panel. The stereo head unit 144 may be connected to a power source. The movable lid 160 may then be closed over the fixed support panel 104, stereo head unit 144, and one or more speakers 140 to seal and protect the fixed support panel, stereo head unit, and one or more speakers within the waterproof compartment 156.

It is noted that an antenna 136 may be placed within the waterproof compartment 156 and below the fixed support panel 104. The antenna 136 may be connected to the stereo head unit 144. In addition, a power source such as a battery may be placed within the waterproof compartment 156 and below the fixed support panel 104. The stereo head unit 144 may be connected to the battery to receive power from the battery. A power source may also or alternatively be connected to the stereo head unit 144 through a power switch 128.

The fixed support panel 104 and optional support sides 108 of the "Durable, High Quality, Portable Sound System Mounting Kit" as described in our abstract and related claims can be created from materials other than polyethylene plastic such as a masonite fiberboard which is a commonly used material in the making of car audio speaker boxes.

The mounting panel and optional support sides can then be covered with a high grade vinyl to create a finished look and provide a surface that is easy to clean

The invention claimed is:

1. A mounting kit for mounting one or more speakers and a car stereo within a cooler comprising:
 a cooler comprising:
  a waterproof container having an open top end, a front wall, a back wall, two side walls, and an enclosed bottom end, the waterproof container being insulated to reduce temperature changes within the waterproof container; and
  a movable lid at a top end of the waterproof container, the movable lid having a peripheral shape corresponding to a peripheral shape of the open top end and configured to seal the open top end from water, dirt, and dust;
 a fixed support panel remote from the movable lid and located below the movable lid and within the waterproof container, the fixed support panel having one or more first cutouts configured to accept at least one car stereo and one or more second cutouts configured to accept at least one speaker, the one or more first cutouts having a distinct shape relative to the one or more second cutouts, the support panel also having a planar shape that extends between the walls of the waterproof container;
 one or more side supports that attach the fixed support panel to an interior portion of the waterproof container below the movable lid, the one or more side supports in contact with a bottom surface of the fixed support panel and at least one wall of the waterproof container, wherein the movable lid of the cooler moves between an open position and a closed position relative to the waterproof container and the fixed support panel without ever contacting the fixed support panel; and
 a battery configured to power the at least one car stereo, the battery located within the waterproof container and below the support panel.

2. The mounting kit of claim 1, wherein the one or more first cutouts are rectangular to conform to a peripheral shape of a rectangular car stereo.

3. The mounting kit of claim 1, wherein the one or more second cutouts are circular to conform to a peripheral shape of one or more circular car stereo speakers.

4. The mounting kit of claim 1, wherein the one or more side supports extend from the bottom surface of the fixed support panel to the enclosed bottom end of the waterproof container of the cooler.

5. The mounting kit of claim 4, wherein the one or more side supports comprise a top edge angled downward from the back wall to the front wall to cause the fixed support panel to slope downward from the back wall to the front wall.

6. The mounting kit of claim 1 further comprising one or more fasteners, wherein the one or more side supports are fastened to the waterproof container of the cooler by the one or more fasteners.

7. The mounting kit of claim 1, wherein the fixed support panel is made from a rigid material selected from the group consisting of masonite fiberboard and polyethylene plastic.

8. The mounting kit of claim 1 further comprising an electrical switch mounted to the fixed support panel.

9. The mounting kit of claim 1 further comprising an antenna mounted below the fixed support panel.

10. A stereo mounting kit for mounting a stereo system within a cooler comprising, in combination:
 a cooler comprising an insulated waterproof container for protecting the stereo system from moisture, the insulated waterproof container comprising:
  a planar bottom;
  a plurality of walls extending upward from the planar bottom to a top end of the insulated waterproof container; and a movable lid at the top end of the insulated waterproof container, the movable lid having a planar shape configured to seal the top end of the insulated waterproof container from water, dirt, and dust;

a fixed support panel remote from the movable lid and located below the movable lid and within the insulated waterproof container, the fixed support panel having a planar body comprising a first rectangular opening and one or more second openings, the first rectangular opening configured to correspond to the peripheral shape of a stereo head unit, the one or more second openings having a distinct shape relative to the first rectangular opening and configured to accept one or more speakers;

one or more side supports that attach the fixed support panel to an interior portion of the insulated waterproof container of the cooler, wherein the movable lid of the cooler moves between an open position and a closed position relative to the waterproof container and the fixed support panel without ever contacting the fixed support panel;

a battery configured to power the stereo head unit, the battery located within the waterproof container and below the fixed support panel;

an antenna having an electrical connector portion for connection with the stereo head unit; and a power switch mounted to the fixed support panel and configured to connect to the battery and the stereo head unit.

11. The mounting kit of claim 10, wherein the one or more side supports have an angled top edge to support the fixed support panel at an angle such that the fixed support panel tilts downward towards a front end of the cooler.

12. The mounting kit of claim 10, wherein the one or more side supports extend from a bottom surface of the fixed support panel to the enclosed bottom of the insulated waterproof container of the cooler.

13. The mounting kit of claim 10 further comprising one or more fasteners, wherein the one or more side supports are attached to an interior portion of the insulated waterproof container of the cooler by the one or more fasteners.

14. The mounting kit of claim 10, wherein the fixed support panel is made from a rigid material selected from the group consisting of masonite fiberboard and polyethylene plastic.

15. A method for mounting a stereo within a cooler comprising:

opening a movable lid of the cooler to gain access to a waterproof compartment of the cooler through a top end of the cooler by moving the lid;

mounting a fixed support panel within the waterproof compartment of the cooler at a location below the movable lid of the cooler by attaching the fixed support panel to an interior side of one or more side walls of the waterproof compartment, wherein the movable lid moves between an open position and a closed position relative to the waterproof compartment and the fixed support panel without ever contacting the fixed support panel;

securing a stereo head unit into a first opening in the fixed support panel;

securing one or more speakers into one or more second openings in the fixed support panel;

connecting the stereo head unit to a power source; and closing the movable lid over the fixed support panel, stereo head unit, and one or more speakers to seal and protect the fixed support panel, stereo head unit, and one or more speakers within the waterproof compartment.

16. The method of claim 15 further comprising placing an antenna within the waterproof compartment and below the fixed support panel and connecting the antenna to the stereo head unit.

17. The method of claim 15 further comprising placing a battery within the waterproof compartment and below the fixed support panel, wherein connecting the stereo head unit to the power source comprises connecting the stereo head unit to the battery.

18. The method of claim 15, wherein connecting the stereo head unit to the power source comprises connecting the stereo head unit to the power source through a power switch.

* * * * *